US008015561B2

(12) United States Patent
Stanev

(10) Patent No.: US 8,015,561 B2
(45) Date of Patent: *Sep. 6, 2011

(54) SYSTEM AND METHOD FOR MANAGING MEMORY OF JAVA SESSION OBJECTS

(75) Inventor: Georgi Stanev, Sofia (BG)

(73) Assignee: SAP AG, Walldorf (DE)

( * ) Notice: Subject to any disclaimer, the term of this patent is extended or adjusted under 35 U.S.C. 154(b) by 1489 days.

This patent is subject to a terminal disclaimer.

(21) Appl. No.: 11/025,316

(22) Filed: Dec. 28, 2004

(65) Prior Publication Data
US 2006/0143609 A1 Jun. 29, 2006

(51) Int. Cl.
*G06F 9/455* (2006.01)
*G06F 15/16* (2006.01)
*G06F 11/00* (2006.01)

(52) U.S. Cl. ............................. 718/1; 709/228; 714/4.11
(58) Field of Classification Search ......... 718/1; 714/13
See application file for complete search history.

(56) References Cited

U.S. PATENT DOCUMENTS

| 5,274,804 | A | 12/1993 | Jackson et al. |
|---|---|---|---|
| 5,692,193 | A | 11/1997 | Jagannathan et al. |
| 5,805,790 | A | 9/1998 | Nota et al. |
| 5,835,724 | A | 11/1998 | Smith |
| 5,884,316 | A | 3/1999 | Bernstein et al. |
| 6,047,295 | A | 4/2000 | Endicott et al. |
| 6,389,460 | B1 | 5/2002 | Stewart et al. |
| 6,502,148 | B1 | 12/2002 | Krum |
| 6,523,027 | B1 | 2/2003 | Underwood |
| 6,539,445 | B1 | 3/2003 | Krum |
| 6,675,214 | B2 | 1/2004 | Stewart et al. |
| 6,763,440 | B1 * | 7/2004 | Traversat et al. ............. 711/159 |
| 6,950,822 | B1 | 9/2005 | Idicula et al. |
| 7,013,329 | B1 | 3/2006 | Paul et al. |
| 7,167,917 | B2 | 1/2007 | Creamer et al. |

(Continued)

FOREIGN PATENT DOCUMENTS
WO WO-0023898 A1 4/2000
(Continued)

OTHER PUBLICATIONS

Pasin, Marcia , et al., "High-Available Enterprise JavaBeans Using Group Communication System Support", pp. 1-6, XP002285985, 2001.

(Continued)

*Primary Examiner* — Emerson C Puente
*Assistant Examiner* — Camquy Truong
(74) *Attorney, Agent, or Firm* — Schwegman, Lundberg & Woessner, P.A.

(57) ABSTRACT

A method for managing a session with a client is described in which the method receives from the client a request for the session. The session is handled with a first virtual machine. The method places the session state information for the session into an object located in the first virtual machine's local memory. The method writes into a shared memory an object that contains the session state information. In response to a failure that renders the first virtual machine unable to handle the session, the method reads the object in the shared memory from the shared memory and places it into a second virtual machine's local memory. Lastly, the method receives from the client another request for the session, and handles the another request with the second virtual machine and the session state information.

16 Claims, 9 Drawing Sheets

U.S. PATENT DOCUMENTS

| | | |
|---|---|---|
| 7,174,363 B1 | 2/2007 | Goldstein et al. |
| 7,177,823 B2 | 2/2007 | Lam et al. |
| 7,185,096 B2 | 2/2007 | Kalyanavarathan et al. |
| 7,197,568 B2 | 3/2007 | Bourne et al. |
| 7,203,944 B1 * | 4/2007 | van Rietschote et al. ..... 718/104 |
| 7,254,634 B1 | 8/2007 | Davis et al. |
| 7,296,267 B2 | 11/2007 | Cota-Robles et al. |
| 7,302,423 B2 | 11/2007 | De Bellis |
| 7,302,609 B2 | 11/2007 | Matena et al. |
| 7,308,501 B2 | 12/2007 | DeLima et al. |
| 7,543,051 B2 | 6/2009 | Greifeneder et al. |
| 2001/0054004 A1 | 12/2001 | Powers |
| 2002/0046304 A1 * | 4/2002 | Fabri et al. ..................... 709/331 |
| 2002/0078060 A1 | 6/2002 | Garst et al. |
| 2002/0078192 A1 | 6/2002 | Kopsell et al. |
| 2002/0116505 A1 | 8/2002 | Higgins et al. |
| 2002/0143958 A1 | 10/2002 | Montero et al. |
| 2002/0188678 A1 | 12/2002 | Edecker et al. |
| 2002/0198923 A1 | 12/2002 | Hayes, Jr. |
| 2003/0014521 A1 | 1/2003 | Elson et al. |
| 2003/0014525 A1 | 1/2003 | DeLima et al. |
| 2003/0018707 A1 | 1/2003 | Flocken |
| 2003/0074580 A1 | 4/2003 | Knouse et al. |
| 2003/0084248 A1 | 5/2003 | Gaither et al. |
| 2003/0167333 A1 | 9/2003 | Kumar et al. |
| 2003/0177382 A1 | 9/2003 | Ofek et al. |
| 2003/0212654 A1 | 11/2003 | Harper et al. |
| 2003/0229529 A1 | 12/2003 | Mui et al. |
| 2004/0024971 A1 | 2/2004 | Bogin et al. |
| 2004/0049673 A1 | 3/2004 | Song et al. |
| 2004/0117486 A1 | 6/2004 | Bourne et al. |
| 2004/0153509 A1 | 8/2004 | Alcorn et al. |
| 2004/0181537 A1 | 9/2004 | Chawla et al. |
| 2004/0221261 A1 | 11/2004 | Blevins |
| 2005/0278278 A1 | 12/2005 | Petev |
| 2005/0278341 A1 | 12/2005 | Kostadinov et al. |
| 2005/0278346 A1 | 12/2005 | Shang et al. |
| 2005/0283585 A1 | 12/2005 | Sexton et al. |
| 2006/0036448 A1 | 2/2006 | Haynie et al. |
| 2006/0047974 A1 | 3/2006 | Alpern et al. |
| 2006/0053112 A1 | 3/2006 | Chitkara et al. |
| 2006/0089992 A1 * | 4/2006 | Blaho ........................... 709/227 |
| 2006/0130063 A1 | 6/2006 | Kilian et al. |
| 2006/0143217 A1 | 6/2006 | Stanev et al. |
| 2006/0143608 A1 | 6/2006 | Dostert et al. |
| 2006/0143609 A1 | 6/2006 | Stanev |
| 2006/0155756 A1 | 7/2006 | Stanev |
| 2006/0206856 A1 | 9/2006 | Breeden et al. |
| 2008/0086564 A1 | 4/2008 | Putman et al. |
| 2008/0201417 A1 | 8/2008 | McCain et al. |
| 2008/0222270 A1 | 9/2008 | Gilbert |

FOREIGN PATENT DOCUMENTS

| | | |
|---|---|---|
| WO | WO03073204 | 9/2003 |
| WO | WO2004038586 | 5/2004 |

OTHER PUBLICATIONS

"U.S. Appl. No. 11/025,200, Examiner Interview Summary mailed Mar. 20, 2009", 3 pgs.

"U.S. Appl. No. 11/025,200, Non Final Office Action mailed Mar. 24, 2009", 12 pgs.

"U.S. Appl. No. 11/025,200, Preliminary Amendment filed Mar. 24, 2005", 4 pgs.

"U.S. Appl. No. 11/025,200, Response filed Jun. 24, 2009 to Non Final Office Action mailed Mar. 24, 2009", 14 pgs.

"U.S. Appl. No. 11/025,549, Non-Final Office Action mailed Mar. 24, 2009", 13 pgs.

"U.S. Appl. No. 11/025,549, Preliminary Amendment filed Mar. 21, 2005", 4 pgs.

"U.S. Appl. No. 11/025,549, Response filed Jun. 24, 2009 to Non Final Office Action mailed Mar. 24, 2009", 9 pgs.

OSDIR, "RE: Barracude: Reference Objects in Session/ServletContext", msg#00056, (Nov. 2002).

"U.S. Appl. No. 11/025,200, Non-Final Office Action mailed Mar. 3, 2010", 11 pgs.

"U.S. Appl. No. 11/025,200 , Final Office Action mailed Nov. 16, 2009", 10 Pgs.

"U.S. Appl. No. 11/025,200, Advisory Action mailed Feb. 3, 2010", 3 pgs.

"U.S. Appl. No. 11/025,200, Response filed Feb. 9, 2010 to Advisory Action mailed Feb. 3, 2010", 15 pgs.

"U.S. Appl. No. 11/025,200, Response filed Jan. 12, 2010 to Final Office Action mailed Nov. 16, 2009", 5 pgs.

"U.S. Appl. No. 11/025,549, Final Office Action mailed Nov. 4, 2009", 9 Pgs.

"U.S. Appl. No. 11/025,549, Response filed Jan. 4, 2010 to Final Office Action mailed Nov. 4, 2009", 13 pgs.

"U.S. Appl. No. 11/025,200, Examiner Interview Summary mailed Mar. 20, 2009", 3 pgs.

"U.S. Appl. No. 11/025,200, Non-Final Office Action mailed Aug. 6, 2010", 11 pgs.

"U.S. Appl. No. 11/025,200, Response filed Nov. 1, 2010 to Non Final Office Action mailed Aug. 6, 2010", 15 pgs.

"U.S. Appl. No. 11/025,200, Final Office Action mailed Dec. 16, 2010", 11 pgs.

"U.S. Appl. No. 11/025,200, Pre-Appeal Brief Request filed Mar. 8, 2011", 5 pgs.

* cited by examiner

SYSTEM AND METHOD FOR MANAGING MEMORY OF JAVA SESSION OBJECTS

BACKGROUND

1. Field of the Invention

This invention relates generally to the field of data processing systems. More particularly, the invention relates to an improved system and method for managing memory of session objects within Java-based system architecture.

2. Description of the Related Art

In order for a data processing device such as a personal computer or personal information manager ("PIM") to display a particular alphanumeric character or group of characters, the alphanumeric character(s) must be installed on the data processing device. For example, in order for a data processing device to display non-English characters, such as the "é" character ("e" with an "accent egu"), a character set, which includes those characters, must first be installed on the data processing device.

BACKGROUND

FIG. 1 shows a prior art computing system 100 having N virtual machines 113, 213, . . . N13. The prior art computing system 100 can be viewed as an application server that runs web applications and/or business logic applications for an enterprise (e.g., a corporation, partnership or government agency) to assist the enterprise in performing specific operations in an automated fashion (e.g., automated billing, automated sales, etc.).

The prior art computing system 100 runs are extensive amount of concurrent application threads per virtual machine. Specifically, there are X concurrent application threads ($112_1$ through $112_X$) running on virtual machine 113; there are Y concurrent application threads ($212_1$ through $212_Y$) running on virtual machine 213; . . . and, there are Z concurrent application threads ($N12_1$ through $N12_Z$) running on virtual machine N13; where, each of X, Y and Z are a large number.

A virtual machine, as is well understood in the art, is an abstract machine that converts (or "interprets") abstract code into code that is understandable to a particular type of a hardware platform. For example, if the processing core of computing system 100 included PowerPC microprocessors, each of virtual machines 113, 213 through N13 would respectively convert the abstract code of threads $112_1$ through $112_X$, $212_1$ through $212_Y$, and $N12_1$ through $N12_Z$ into instructions sequences that a PowerPC microprocessor can execute.

Because virtual machines operate at the instruction level they tend to have processor-like characteristics, and, therefore, can be viewed as having their own associated memory. The memory used by a functioning virtual machine is typically modeled as being local (or "private") to the virtual machine. Hence, FIG. 1 shows local memory 115, 215, N15 allocated for each of virtual machines 113, 213, . . . N13 respectively.

A portion of a virtual machine's local memory may be implemented as the virtual machine's cache. As such, FIG. 1 shows respective regions 116, 216, . . . N16 of each virtual machine's local memory space 115, 215, . . . N15 being allocated as local cache for the corresponding virtual machine 113, 213, . . . N13. A cache is a region where frequently used items are kept in order to enhance operational efficiency. Traditionally, the access time associated with fetching/writing an item to/from a cache is less than the access time associated with other place(s) where the item can be kept (such as a disk file or external database (not shown in FIG. 1)).

For example, in an object-oriented environment, an object that is subjected to frequent use by a virtual machine (for whatever reason) may be stored in the virtual machine's cache. The combination of the cache's low latency and the frequent use of the particular object by the virtual machine corresponds to a disproportionate share of the virtual machine's fetches being that of the lower latency cache; which, in turn, effectively improves the overall productivity of the virtual machine.

A problem with the prior art implementation of FIG. 1, is that, a virtual machine can be under the load of a large number of concurrent application threads; and, furthermore, the "crash" of a virtual machine is not an uncommon event. If a virtual machine crashes, generally, all of the concurrent application threads that the virtual machine is actively processing will crash. Thus, if any one of virtual machines 113, 213, N13 were to crash, X, Y or Z application threads would crash along with the crashed virtual machine. With X, Y and Z each being a large number, a large number of applications would crash as a result of the virtual machine crash.

Given that the application threads running on an application server 100 typically have "mission critical" importance, the wholesale crash of scores of such threads is a significant problem for the enterprise.

SUMMARY

A method for managing a session with a client is described in which the method receives from the client a request for the session. The session is handled with a first virtual machine. The method places the session state information for the session into an object located in the first virtual machine's local memory. The method writes into a shared memory an object that contains the session state information. In response to a failure that renders the first virtual machine unable to handle the session, the method reads the object in the shared memory from the shared memory and places it into a second virtual machine's local memory. Lastly, the method receives from the client another request for the session, and handles the another request with the second virtual machine and the session state information.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Figure 1:
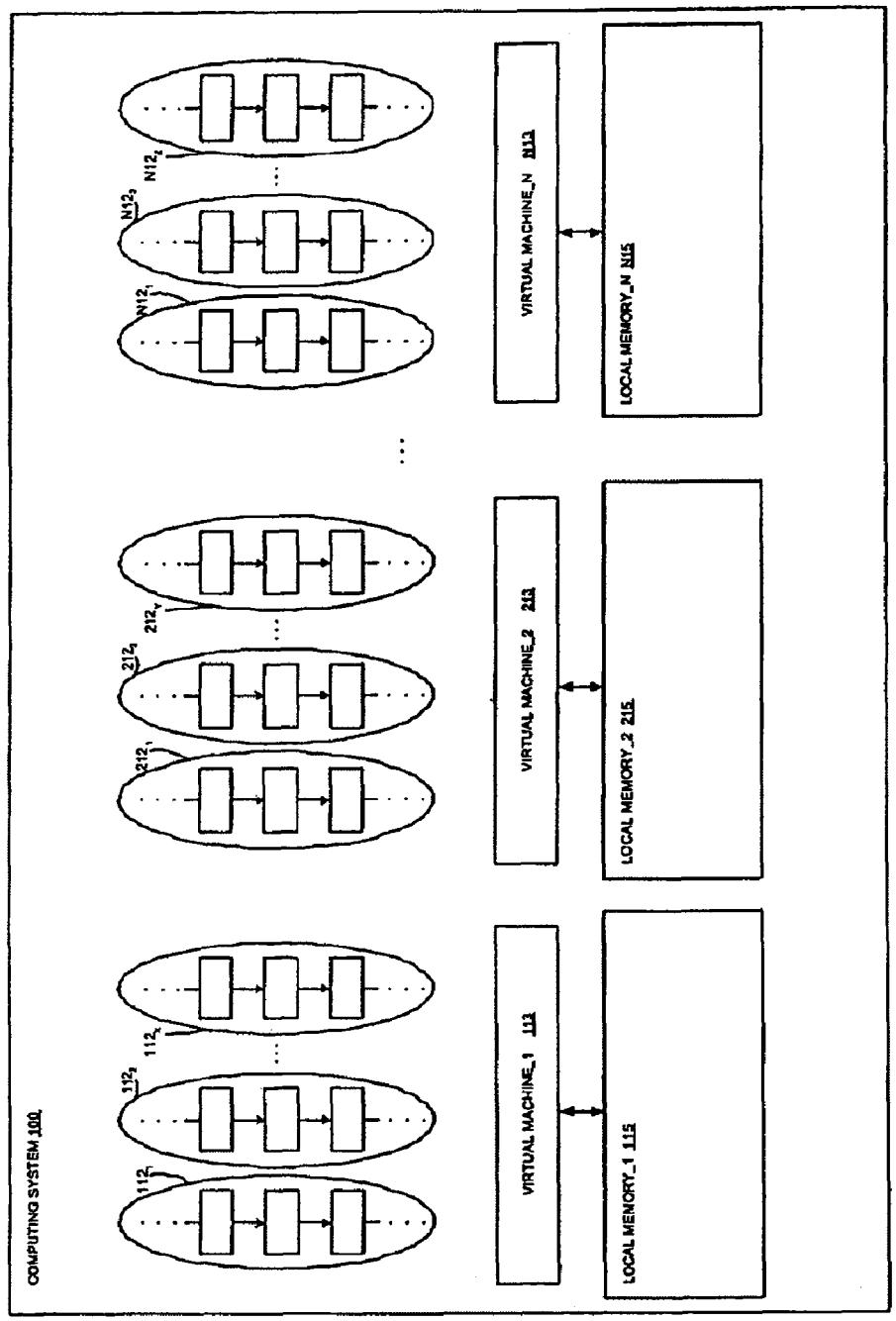
FIG. 1 illustrates a portion of a prior art computing system.
Figure 2:
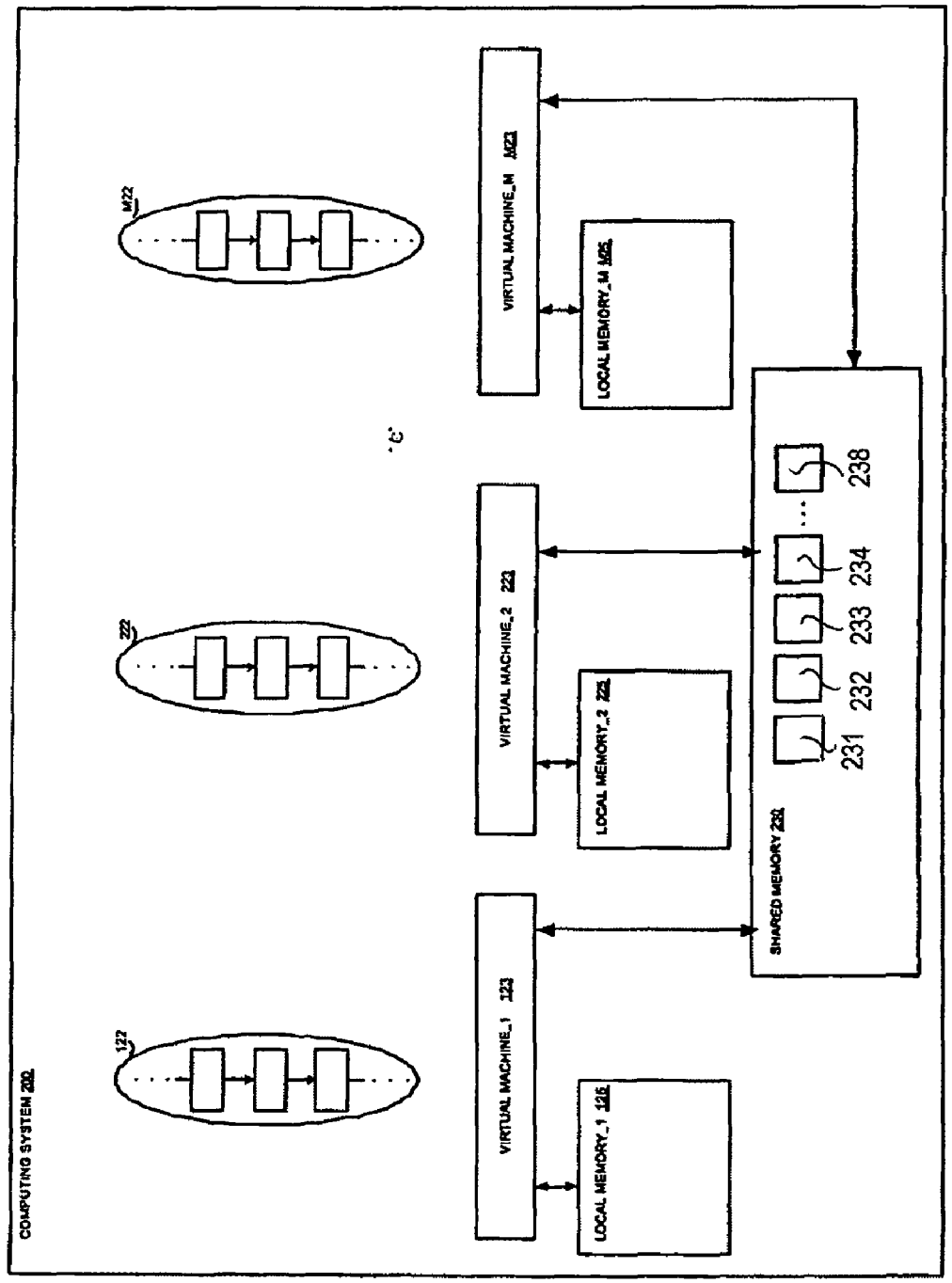
FIG. 2 illustrates a portion of an improved computing system.

FIG. 2 shows a computing system 200 that is configured with less application threads per virtual machine than the prior art system of FIG. 1. Less application threads per virtual machine results in less application thread crashes per virtual machine crash; which, in turn, should result in the new system 200 of FIG. 2 exhibiting better reliability than the prior art system 100 of FIG. 1.

According to the depiction of FIG. 2, which is an extreme representation of the improved approach, only one application thread exists per virtual machine (specifically, thread 122 is being executed by virtual machine 123; thread 222 is being executed by virtual machine 223; ... and, thread M22 is being executed by virtual machine M23). In practice, the computing system 200 of FIG. 2 may permit a limited number of threads to be concurrently processed by a single virtual machine rather than only one.

In order to concurrently execute a comparable number of application threads as the prior art system 100 of FIG. 1, the improved system 200 of FIG. 2 instantiates more virtual machines than the prior art system 100 of FIG. 1. That is, M>N.

Thus, for example, if the prior art system 100 of FIG. 1 has 10 application threads per virtual machine and 4 virtual machines (e.g., one virtual machine per CPU in a computing system having four CPUs) for a total of 4×10=40 concurrently executed application threads for the system 100 as a whole, the improved system 200 of FIG. 2 may only permit a maximum of 5 concurrent application threads per virtual machine and 6 virtual machines (e.g., 1.5 virtual machines per CPU in a four CPU system) to implement a comparable number (5×6=30) of concurrently executed threads as the prior art system 100 in FIG. 1.

Here, the prior art system 100 instantiates one virtual machine per CPU while the improved system 200 of FIG. 2 can instantiate multiple virtual machines per CPU. For example, in order to achieve 1.5 virtual machines per CPU, a first CPU will be configured to run a single virtual machine while a second CPU in the same system will be configured to run a pair of virtual machines. By repeating this pattern for every pair of CPUs, such CPU pairs will instantiate 3 virtual machines per CPU pair (which corresponds to 1.5 virtual machines per CPU).

Recall from the discussion of FIG. 1 that a virtual machine can be associated with its own local memory. Because the improved computing system of FIG. 2 instantiates more virtual machines that the prior art computing system of FIG. 1, in order to conserve memory resources, the virtual machines 123, 223, ... M23 of the system 200 of FIG. 2 are configured with less local memory space 125, 225, ... M25 than the local memory 115, 215, ... N15 of virtual machines 113,213, ... N13 of FIG. 1. Moreover, the virtual machines 123, 223, ... M23 of the system 200 of FIG. 2 are configured to use a shared memory 230. Shared memory 230 is memory space that contains items 231-238 that can be accessed by more than one virtual machine (and" typically, any virtual machine configured to execute "like" application threads that is coupled to the shared memory 230).

Thus, whereas the prior art computing system 100 of FIG. 1 uses fewer virtual machines with larger local memory resources containing objects that are "private" to the virtual machine; the computing system 200 of FIG. 2, by contrast, uses more virtual machines with less local memory resources. The less local memory resources allocated per virtual machine is compensated for by allowing each virtual machine to access additional memory resources. However, owing to limits in the amount of available memory space, this additional memory space 230 is made "shareable" amongst the virtual machines 123, 223, ... M23.

According to an object oriented approach where each of virtual machines 123, 223, ... N23 does not have visibility into the local memories of the other virtual machines, specific rules are applied that mandate whether or not information is permitted to be stored in shared memory 230. Specifically, to first order, according to an embodiment, an object residing in shared memory 230 should not contain a reference to an object located in a virtual machine's local memory because an object with a reference to an unreachable object is generally deemed "non useable".

That is, if an object in shared memory 230 were to have a reference into the local memory of a particular virtual machine, the object is essentially non useable to all other virtual machines; and, if shared memory 230 were to contain an object that was useable to only a single virtual machine, the purpose of the shared memory 230 would essentially be defeated.

In order to uphold the above rule, and in light of the fact that objects frequently contain references to other objects (e.g., to effect a large process by stringing together the processes of individual objects; and/or, to effect relational data structures), "shareable closures" are employed. A "closure" is a group of one or more objects where every reference stemming from an object in the group that references another object does not reference an object outside the group. That is, all the object-to-object references of the group can be viewed as closing upon and/or staying within the confines of the group itself. Note that a single object without any references stemming from can be viewed as meeting the definition of a closure.

If a closure with a non shareable object were to be stored in shared memory 230, the closure itself would not be shareable with other virtual machines, which, again, defeats the purpose of the shared memory 230. Thus, in an implementation, in order to keep only shareable objects in shared memory 230 and to prevent a reference from an object in shared memory 230 to an object in a local memory, only "shareable" (or "shared") closures are stored in shared memory 230. A "shared closure" is a closure in which each of the closure's objects are "shareable".

A shareable object is an object that can be used by other virtual machines that store and retrieve objects from the shared memory 230. As discussed above, in an embodiment, one aspect of a shareable object is that it does not possess a reference to another object that is located in a virtual machine's local memory. Other conditions that an object must meet in order to be deemed shareable may also be effected. For example, according to a particular Java embodiment, a shareable object must also posses the following characteristics: 1) it is an instance of a class that is serializable; 2) it is an instance of a class that does not execute any custom serializing or deserializing code; 3) it is an instance of a class whose base classes are all serializable; 4) it is an instance of a class whose member fields are all serializable; 5) it is an instance of a class that does not interfere with proper operation of a garbage collection algorithm; 6) it has no transient fields; and, 7) its finalize ( ) method is not overwritten.

Exceptions to the above criteria are possible if a copy operation used to copy a closure into shared memory 230 (or from shared memory 230 into a local memory) can be shown to be semantically equivalent to serialization and deserialization of the objects in the closure. Examples include instances of the Java 2 Platform, Standard Edition 1.3 java.lang.String class and java.util.Hashtable class.

A container is used to confine/define the operating environment for the application thread(s) that are executed within the container. In the context of J2EE, containers also provide a family of services that applications executed within the container may use (e.g., (e.g., Java Naming and Directory Interface (JNDI), Java Database Connectivity (JDBC), Java Messaging Service (JMS) among others).

Different types of containers may exist. For example, a first type of container may contain instances of pages and servlets for executing a web based "presentation" for one or more applications. A second type of container may contain granules of functionality (generically referred to as "components" and, in the context of Java, referred to as "beans") that reference one another in sequence so that, when executed according to the sequence, a more comprehensive overall "business logic" application is realized (e.g., stringing revenue calculation, expense calculation and tax calculation components together to implement a profit calculation application).

Figure 3:
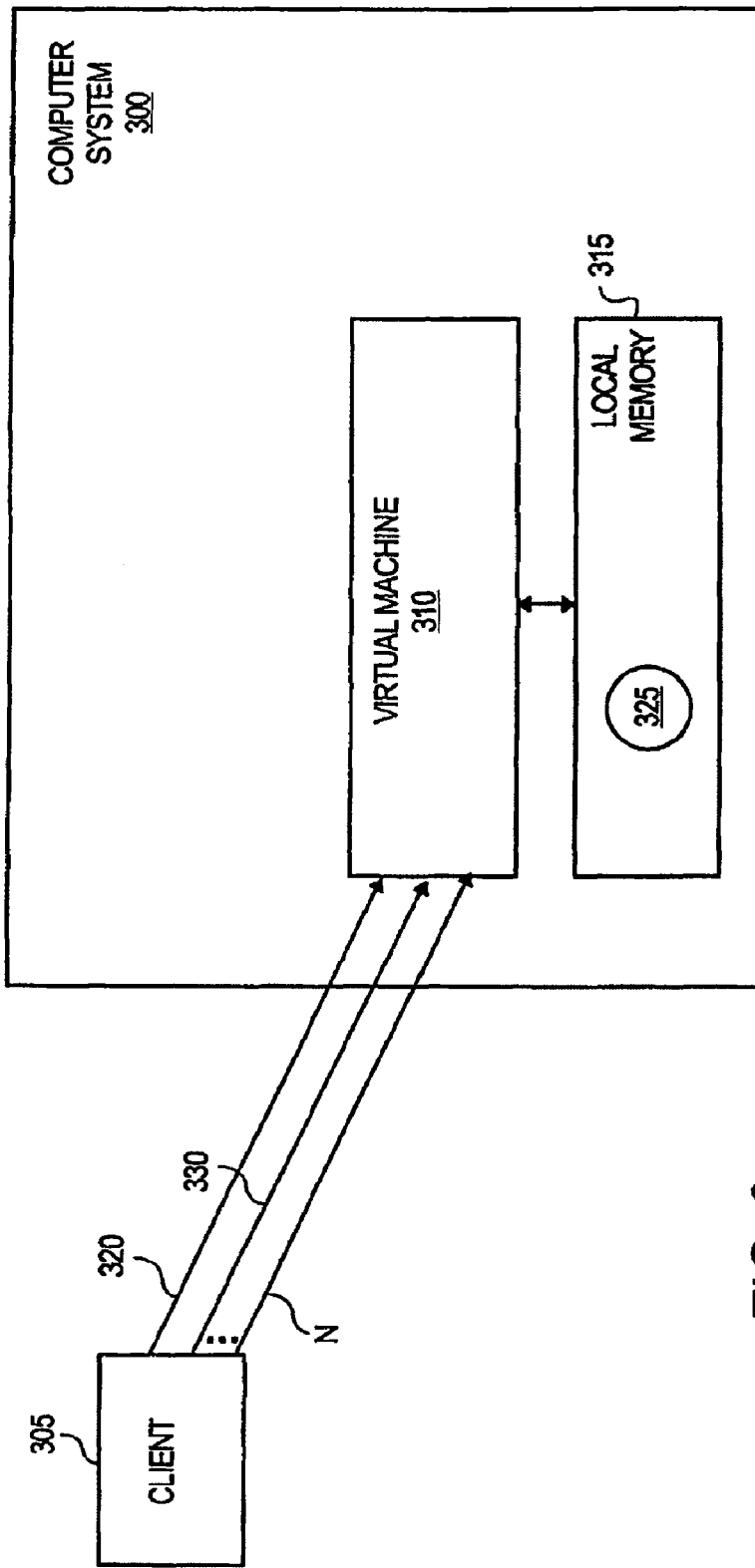
FIG. 3 illustrates a prior art computing system, which offers no fail over protection for session objects.

FIG. 3 shows that more than one thread can be actively processed by the virtual machine 323 depicted therein. It should be understood that, in accordance with the discussion concerning FIG. 2, the number of threads that the virtual machine 323 can concurrently entertain should be limited (e.g., to some fixed number) to reduce the exposure to a virtual machine crash. For example, according to one implementation, the default number of concurrently executed threads is 5. In a further implementation, the number of concurrently executed threads is a configurable parameter so that, conceivably, for example, in a first system deployment there are 10 concurrent threads per virtual machine, in a second system deployment there are 5 concurrent threads per virtual machine, in a third system deployment there is 1 concurrent thread per virtual machine. It is expected that a number of practical system deployments would choose less than 10 concurrent threads per virtual machine.

Examples of the Prior Art's Handling of Session Objects

An exemplary model of the prior art's handling of session objects are shown in FIG. 3. A Computing System 300, comprises a Virtual Machine (hereinafter "VM") 310, and a local memory 315 where at least one session object is kept when requests are made from client 305. When client 305 communicates with and makes a first request 320 to VM 310, a session object 325 is created and placed in local memory 315. Object 325 is activated upon its creation. When client 305 makes a second request 330 to VM 310, the session's state information is written to object 325. Client 305 may make additional N requests to VM 310. Each additional request would alter the client's state information, which would in turn be written to session object 325.

Session state information contains details of a client's session with an application. In one embodiment, this might include a client who visits a website. In such an embodiment, the state information would include what page(s) the client has visited or currently visiting, where the client came from (e.g. the referring website), and what information the client has accessed. If the website sells goods or service, the state information might also include the goods and/or services the client has requested to purchase (e.g., a shopping cart), as well as address and payment information. As additional requests are made from client 305, the session's state information is continuously written to session object 325.

An Exemplary System for Memory Management of Session Objects

Figure 4A:
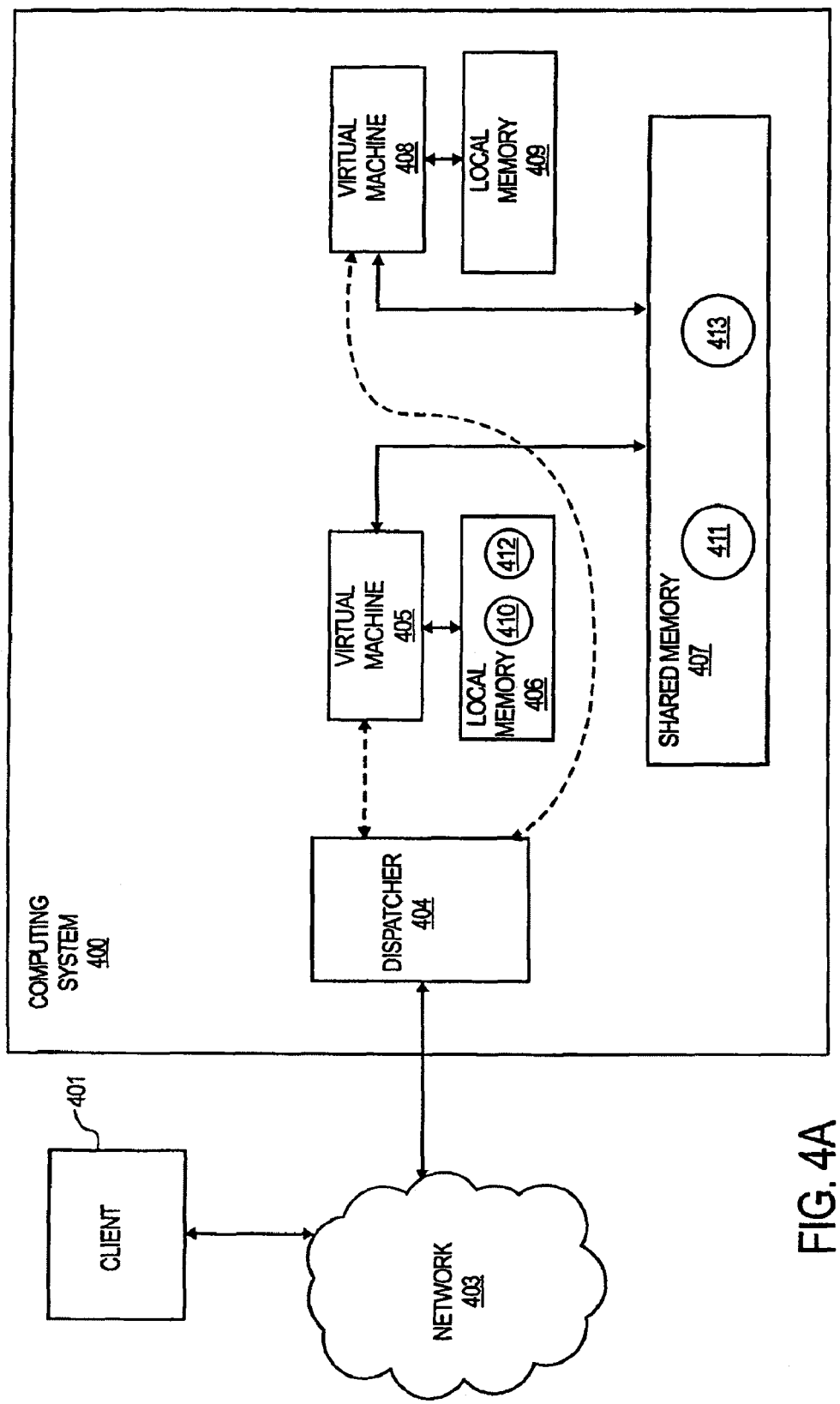
FIG. 4A illustrates fail over protection, before a system crash, through the use of an externally shared memory for storing session objects during an active client session.

FIG. 4A illustrates fail over protection of session objects by using a shared memory. In computing system 400 two VMs are present. Each VM also comprises a local memory. In this example, VM 405 has a local memory 406. and VM 408 has a local memory 409. In a typical, a computing system, more than two VMs per computing system are possible.

As discussed in the background section, a Virtual Machine, also known as an interpreter, is a middleware component on a computing system. The purpose of a VM or interpreter is to allow software applications to be written independent of the hardware platform they will run on. Before VMs were used, software applications had to be written specifically to run on a single hardware platform such an Apple Macintosh, IBM PC, Sun Solaris, or IBM RISC. If an application were written for an IBM PC, its code is not compatible with a Macintosh platform and vise versa. Virtual Machines remove this limitation by allowing software to be written once, yet be capable of running on multiple platforms. The VM acts as a translator by receiving abstract code, as an input (e.g., Java bytecode) and outputting language the specific hardware platform can understand. Hence, the alternate name of "interpreter".

VM 405 contains a local memory 406 where session objects are created upon requests made from client 401. VM 408 also contains a local memory 409, which is also capable of storing session objects from client 401. A local memory may exist for each VM. In a typical embodiment, a local memory is allotted for a single VM, such that no other VMs are permitted to utilize the local memory of another VM. A shared memory 407 exists where session objects from VM 405 and VM 408 may be stored. Shared memory 407 can be viewed as being "external" to VM 405, VM 408 and any other VMs, but "internal" to the overall computing system 400. VM 405, VM 408 and any other VMs coupled to system 400 may be granted access to shared memory 407 in order to read or write information to and from it.

System 400 is coupled through a dispatcher 404, to a network 403 that transmits the communication requests from client 401 toward the appropriate virtual machine(s) that are to handle client 401's session(s). Dispatcher 404 is responsible for routing session requests, from client 401 to one of the VMs. Dispatcher 404 will query the existing workload of computing system 400 to determine which VM is best equipped to handle client 401's session.

In this example, upon creation of client 401's initial request, VM 405 is assigned to handle the session with client 401. A first session object 410 is created and placed in local memory 406. At this point, object 410 is a local object and only exists in one location (local memory 406). Object 410 (e.g., as part of the initial communication in an HTTP session with client 401) is in an activated state upon its creation. In one embodiment, object 410 is automatically deactivated after its creation and a copy 411 is written to shared memory 407, where copy 411 remains in a deactivated state. In this embodiment, a new session object is deactivated and written to shared memory after the successful handling of each client request. This embodiment ensures that session fail over exists between each request, during the same session, from client 401. In another embodiment, object 410 is not deactivated and written to shared memory 407 immediately after the successful handling of each client request. Instead, a predetermined period of time is set by which object 410 remains in local memory 406. During this time, it is possible than multiple requests from client 401 could be made. Each state change in client 401's session would be continuously written to object 410. Once the predetermined time interval expires, object 410 would then be deactivated and written to shared memory 407 as copy 411.

If and when client 401 makes additional requests to VM 405, as part of the same session that object 410 was created for, copy 411 is read from shared memory 407 and placed into local memory 406 as new session object 412. In one embodiment object 412 would be copied to local memory 406 after each request from client 401. In such an embodiment, the currently activated object in local memory 406 is always copied to shared memory 407 after the receipt of each client request, after the initial request is received. Hence, when VM 405 receives each new client request, the current object in shared memory is copied to local memory 406. In another embodiment, as mentioned above, the same object in local memory 406 may be used for two or more consecutive requests received within a predetermined period of time. Under such an embodiment, object 411 would not be copied to local memory 406, based on VM 405 receiving a new request from client 401, unless the predetermined period of time has expired. Once time has expired, object 410 is copied into shared memory 407 as object 411. Upon the next client request received, object 411 would then be copied from shared memory 407 to local memory 406, as object 412.

Upon its creation and placement in local memory 406, object 412 is changed from a deactivated to an activated state. Changes to the session's state information are stored in new object 412. Once the changes are written to new object 412, it is placed in the deactivated state and another copy 413 is written to shared memory 407. Based on the embodiments mentioned above, copy 413 could be written to shared memory 407 after each client request, or only after a predetermined time interval expires. Copy 413 also remains in the deactivated state unless read back to local memory 406 at a later time (if client 401 makes further requests).

Figure 4B:
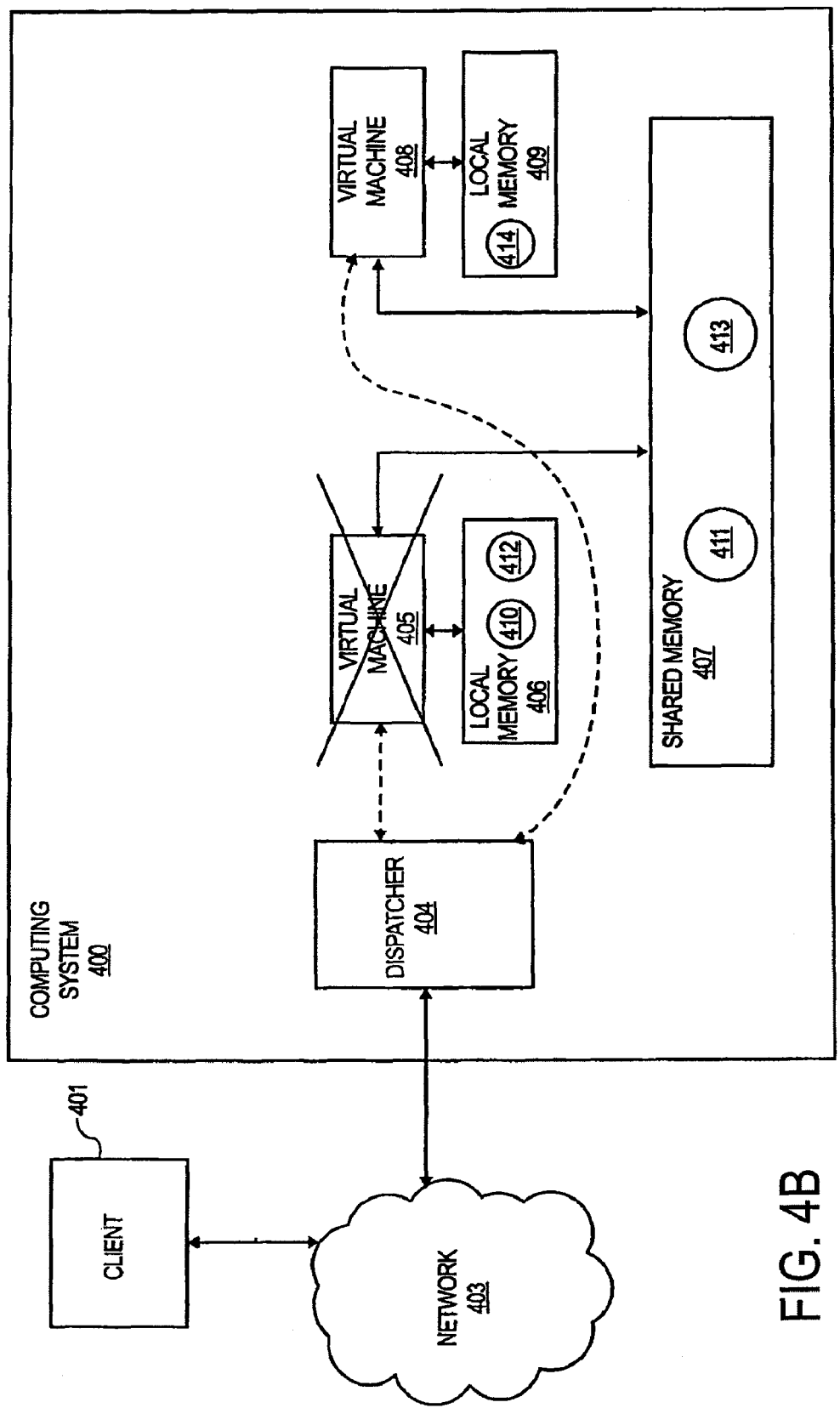
FIG. 4B illustrates fail over protection, after a system crash, through the use of an externally shared memory for storing session objects during an active client session.

FIG. 4B illustrates the same system as shown in FIG. 4A, but with a VM crash occurring at VM 405. In this example, VM 205 has crashed, which is represented by a large "X" placed over VM 405. When such a crash occurs while the current session with client 401 is ongoing, Computing System 400 will still be able to handle the session. Here, VM 408 (which may be instantiated for the purpose of resuming client 401's session) would be able to retrieve the latest session object from shared memory 407. In this case, object 413 contains the latest session information. Object 413 is read from shared memory 407 and placed into local memory 409 as new session object 414. This process allows client 401's current session to continue even though VM 405 is no longer available.

The prior art system of FIG. 3 only maintains session objects within the local memory of each VM. If VM 310 were to crash, all the existing session objects would be lost since they were only present in local memory 315, which was erased due to the crash. However, Computing System 400 (of FIGS. 4A and 4B) provides fail over protection due to the presence of shared memory 407. Even though a crash of VM 405 has occurred, the session's latest object for client 401's session exists in shared memory 407. Backup VM 408 could easily retrieve the latest session object from shared memory 407 such that no loss of session data would occur.

Figure 5:
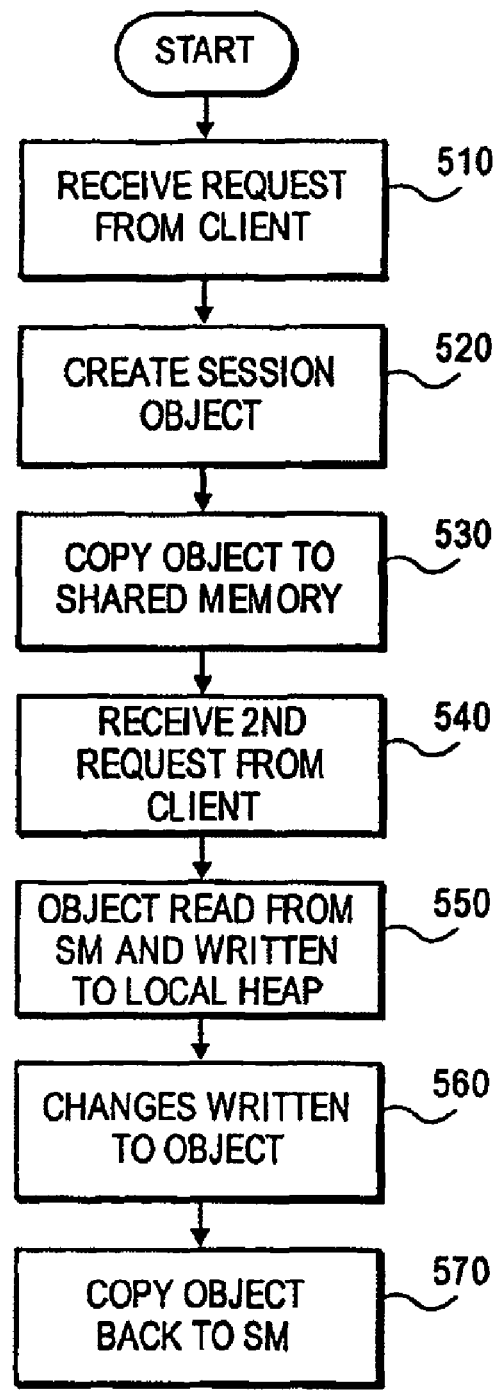
FIG. 5 illustrates a flow chart of the processes used for an externally shared memory for storing session objects during an active client session.

FIG. 5 illustrates a flowchart of the processes by which two or more VMs would use a shared memory to store and retrieve session objects from an individual client session. First, a client attempts 510 to establish a communication session with a VM (e.g., by sending an HTTP request for access to an application). If there are multiple VMs available, a dispatcher is responsible for routing the client request to one of them. A session object is created 520 for this specific client's session. The session object is activated upon creation and placed in local memory of the VM. The session object is deactivated and a copy is written 530 to the shared memory. The copy placed in the shared memory now resides external to the VM and may be accessed by all VMs connected to the shared memory.

Then, the client again invokes 540 the session with the VM (e.g., with another request). Instead of using the session object that resides locally on the VM, the object placed in shared memory is used instead. That is, the session object is read from the shared memory and placed in local memory 550. The object is activated so that the client may use it. Session activity taken by the client is written 560 to the session object in local memory. The session object is eventually deactivated and copied 570 to the externally shared memory, allowing it to be accessed by any other VM connected to the shared memory.

Recalling the initial session object 410, once object 410 was deactivated, it became a "dead session" object since it will no longer be used. A "dead session" is the physical instance of an "active session", which is no longer in the scope of a client request and cannot be accessed or reached by the application any longer. In terms of Java, this object is known as an unreachable object. An unreachable object is one that can't be accessed from an application because the object is no longer referenced by any other objects. Since a "dead session" object is no longer accessible, it becomes useless to local memory 406.

Any time an object is created, some amount of memory must be allocated for this object. Until that object is removed, the memory allocated to it is unavailable. As with all computing systems, the local memory of each VM has a limited amount of memory available to it. As more objects are created, less free memory remains available. An unreachable, or dead object continues to hold the memory allocated upon its creation, until the object is deleted. Typically, Java does not allow for the manual removal of objects (including session objects). The standard Java Garbage Collector (hereinafter "GC") is responsible for removing them in environments that depend on the GC. The GC will periodically (usually every few seconds) delete any objects that are unreachable in order to free up the memory allocated for those objects.

In the present example illustrated by FIG. 4A, object 410 and object 412 become "dead session" objects after they are deactivated and a copy of them are written to shared memory 407. Depending on the length of client 401's session, local memory 406 could end up with many dead session objects that are eventually deleted in order to free up memory. If there are numerous clients accessing VM 405, the free memory in local memory 406 can become constrained or run out. Therefore, unreachable or dead objects should be deleted.

Figure 6:
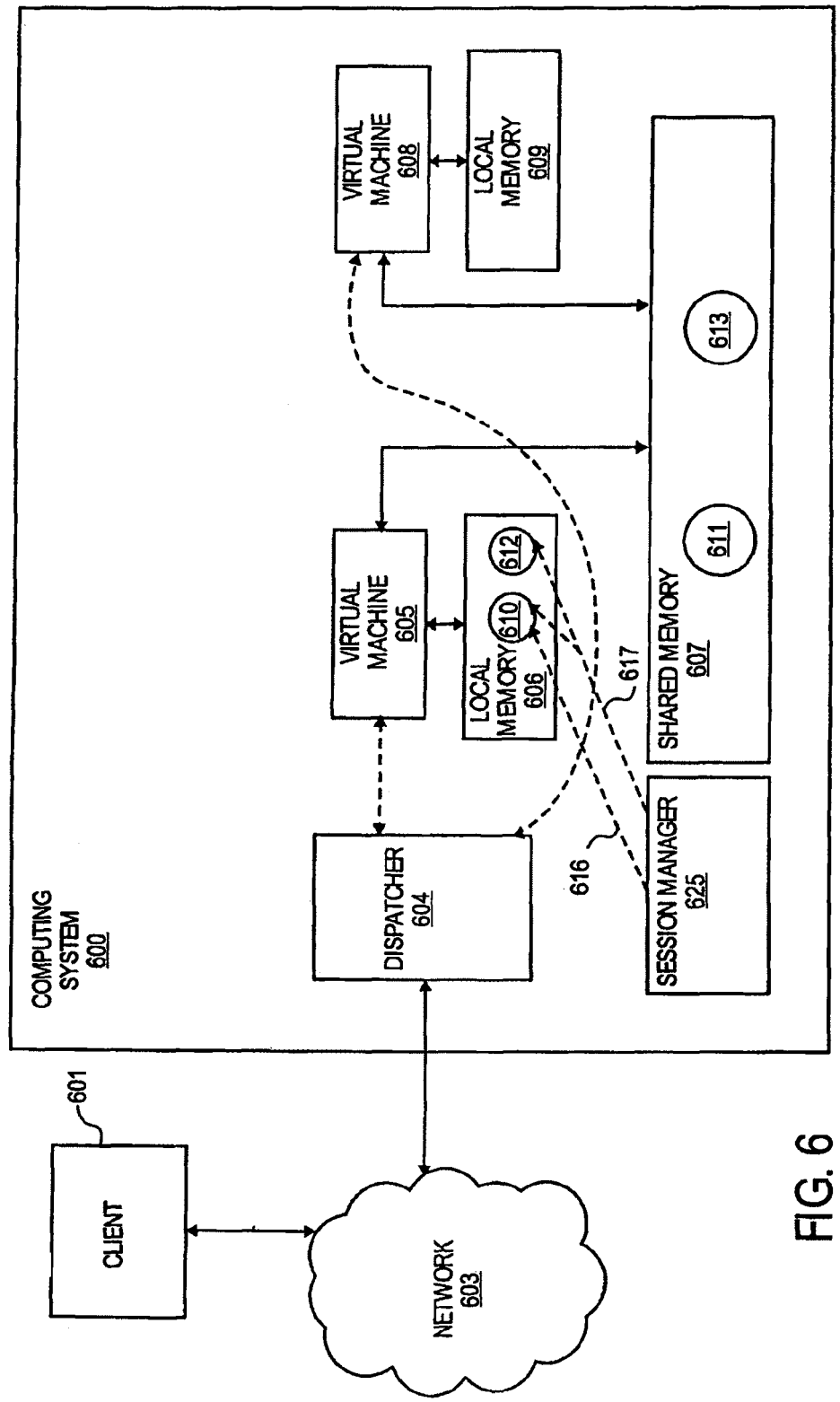
FIG. 6 illustrates fail over protection through the use of soft references and an externally shared memory for storing session objects during an active client session.

An exemplary system according to another embodiment is illustrated in FIG. 6. Like the system of FIG. 4A, FIG. 4A illustrates fail over protection of session object by using shared memory. In addition, FIG. 6 uses soft references between session objects to allow for the possibility of their reuse. As with the system of FIG. 4A, System 600 contains two VMs. VM 605 contains a local memory 606 where session objects are created when requests are made from client 601. VM 608 also contains a local memory 609. A shared memory 607 exists that is accessible to both VM 605 and VM 608. Shared memory 607 can be viewed as being "external" to VM 605, VM 608 and any other VMs, but "internal" to Computing System 600. VM 605, VM 608 and other VMs within system 600 may be granted access to shared memory 607 in order to read or write information to and from it. System 600 also contains a session manager 625. Session manager 625 is responsible for creating soft references (described below) to session objects.

System 600 is coupled through a dispatcher 604, to a network 603 that transmits the communication requests from client 601 toward the appropriate virtual machine(s) that are to handle client 601's session(s). Dispatcher 604 is responsible for routing session requests, from client 601 to one of the VMs. Dispatcher 604 will query the existing workload of Computing System 600 to determine which VM is best equipped to handle client 601's session.

In this example, upon creation of client 601's initial request, VM 605 is assigned to handle the session with client 601. A first session object 610 is created and placed in local memory 606. At this point, object 610 is a local object and only exists in one location (local memory 606). Object 610 (e.g., as part of the initial communication in an HTTP session with client 601) is in an activated state upon its creation. Next, object 610 is deactivated and written to shared memory 607 as object 611. Object 611 also is in a deactivated state while residing in shared memory 607.

After object 611 is written to shared memory 607 a "soft reference" 616 is created from session manager 625 to object 610. In one embodiment, such a reference is created by calling Java method java.lang.ref.SoftReference( ). Creating a "soft reference" to object 610 provides an advantage over the embodiment illustrated in FIG. 4A. In FIG. 4A, once object 410 was deactivated it became a "dead session" object and would be automatically deleted by the GC since it was not referenced by any other objects (e.g., unreachable). In the present embodiment, creating a "soft reference" to object 610 allows the object to remain reachable and available until the physical memory of local memory 606 runs low. Such a softly referenced object would remain in local memory 606 as long as there is adequate free memory. This is due to the nature of the GC to forego the deletion of such objects until physical memory runs too low.

The purpose of creating a "soft reference" to object 610 from session manager 625 is to provide for the possible reuse of object 610 at a later time. The alternative (as taught in FIG. 4A) is to automatically read object 611 from shared memory 607 and write another copy of it to local memory 606. However, this approach involves some overhead in the form of read/write accesses to shared memory 607. In FIG. 6, if and when client 601 makes additional session requests, VM 605 will attempt to reuse object 610. In one embodiment, VM 605 first looks to local memory 606 to see if object 610 still exists (e.g., it has not been deleted by the GC because of the soft reference). If object 610 still exists, VM 605 will then verify its contents. If the contents of object 610 are the same as the contents of object 611, object 610 may be reused. However, it is possible that object 611 was altered by another VM, while residing in shared memory 607. Under such circumstances, object 610 (in local memory) and object 611 (in shared memory) could have different information. If this was the case, or if the GC deleted object 610, object 610 is not reusable and object 611 would be read from shared memory 607 and a new copy object 612 would be written to local memory 606.

Next, VM 605 writes the changes from the client's session state to object 610 or 612 (depending on whether 610 was reusable or a new object 612 had to be copied from shared memory 607). From here, object 610 or 612 is deactivated and a copy 613 of object 610 or 612 is written to shared memory 607. Another "soft reference" 617 is created from session manager 625 to object 610 or 612 (depending on which was used last). This allows for object 610/612 to remain available for reuse as long as adequate free memory is available and the GC does not remove object 610/612. Hence, it is possible that only a single session object (e.g., object 610) would be needed in local memory 606 for client 601's entire session. This can cut down on the resources required for the GC to delete multiple dead session objects as well as the reduction in copying multiple session objects from shared memory 607 back to local memory 606.

Figure 7:
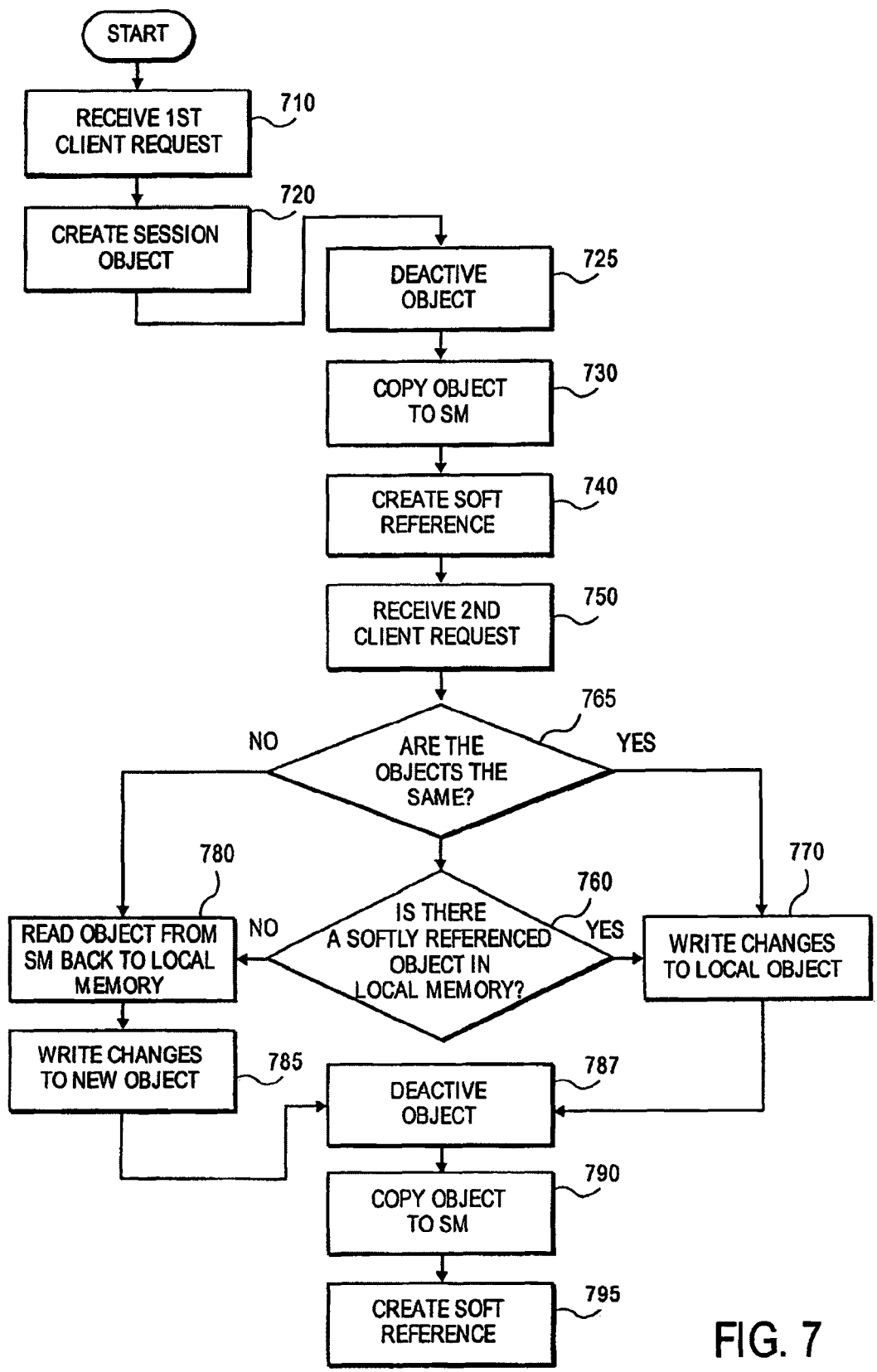
FIG. 7 illustrates a flow chart of the processes used for soft referencing and an externally shared memory for storing session objects during an active client session.

FIG. 7 illustrates a flowchart of the process by which an externally shared memory is used by two or more VM's to store and retrieve session objects from an individual client session. This process differs from FIG. 5 by creating a "soft reference" to all locally created session objects so that their reuse may be possible. This could reduce the number of read requests from shared memory since objects in local memory may be reusable.

First, a client attempts 710 to establish a communication session with a VM (e.g., by sending an HTTP request for access to an application). If there are multiple VMs available, a dispatcher is responsible for routing the client request to one of them. A session object is created 720 on the chosen VM for this specific client. The session object is activated upon creation and placed in local memory of the chosen VM. Next, the object is deactivated 725. Deactivation allows for the object to be placed in a serializable state, permitting it to be copied to another location. Next, a copy of the session object is written 730 to shared memory. A "soft reference" is created 740 from the session manager to the session object in local memory. With the object in local memory being softly referenced, the GC will only remove this object if physical memory is low. As long as local memory is sufficient, this object will remain through the client's session.

Then, the client again invokes 750 the session with the VM. The VM first looks in local memory to see if the softly referenced session object still exists 760 (e.g. the object was not deleted by the GC.) If there is a softly referenced session object in local memory that is usable, the VM verifies the contents of the object in local memory to the object in shared memory. If their contents are the same 765, the VM can reuse the object from local memory, after reactivating it. Changes to the client's session state are written 770 back to the object. The session object is deactivated 787 and written back 790 to shared memory. Lastly, a "soft reference" is created 795 from the session manager to the session object in local memory.

If there is no softly referenced object in local memory, or if there is but it contains different contents than the object in shared memory, the VM reads the object 780 in shared memory back to local memory. The VM then reactivates the object and writes the changes 785 from the client session's state to the session object in local memory. Next, the session object is deactivated 787 and copied back 790 to shared memory. Lastly, a "soft reference" is created 795 from the session manager to the session object in local memory. Procedures 750 to 795 would continuously occur each time another client revives the session (e.g., with another request).

The server may be Java 2 Enterprise Edition ("J2EE") server nodes, which support Enterprise Java Bean ("EJB") components and EJB containers (at the business layer) and Servlets and Java Server Pages ("JSP") (at the presentation layer). Of course, other embodiments may be implemented in the context of various different software platforms including, by way of example, Microsoft .NET, Windows/NT, Microsoft Transaction Server (MTS), the Advanced Business Application Programming ("ABAP") platforms developed by SAP AG and comparable platforms.

Processes taught by the discussion above may be performed with program code such as machine-executable instructions, which cause a machine (such as a "virtual machine", a general-purpose processor disposed on a semiconductor chip or special-purpose processor disposed on a semiconductor chip) to perform certain functions. Alternatively, these functions may be performed by specific hardware components that contain hardwired logic for performing the functions, or by any combination of programmed computer components and custom hardware components.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 8:
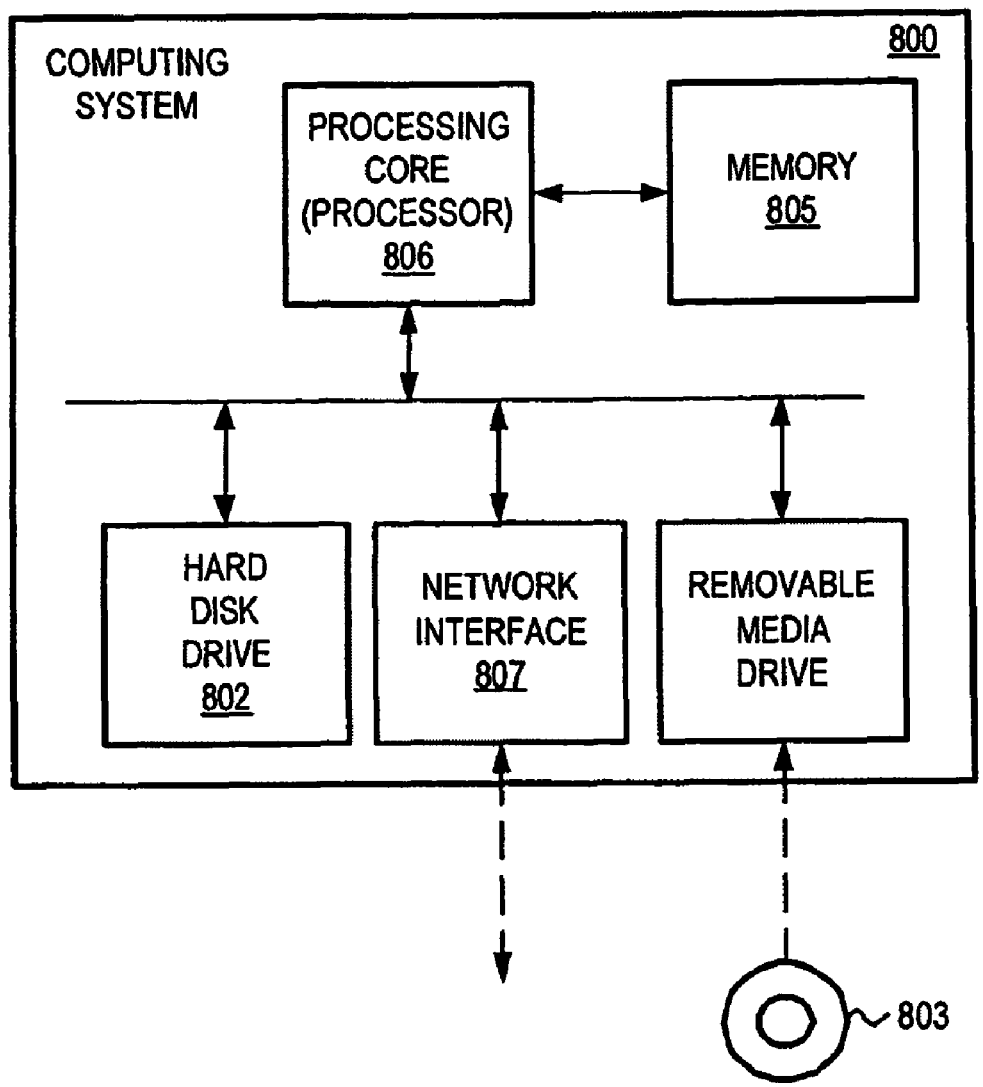
FIG. 8 illustrates a block diagram of a computing system that can execute program code stored by an article of manufacture.

FIG. 8 illustrates a block diagram of a computing system 800 that can execute program code stored by an article of manufacture. It is important to recognize that the computing system block diagram of FIG. 8 is just one of various computing system architectures. The applicable article of manufacture may include one or more fixed components (such as a hard disk drive 802 or memory 805) and/or various movable components such as a CD ROM 803, a compact disc, a magnetic tape, etc. In order to execute the program code, typically instructions of the program code are loaded into the Random Access Memory (RAM) 805; and, the processing core 806 then executes the instructions. The processing core may include one or more processors and a memory controller function. A virtual machine or "interpreter" (e.g., a Java Virtual Machine) may run on top of the processing core (architecturally speaking) in order to convert abstract code (e.g., Java bytecode) into instructions that are understandable to the specific processor(s) of the processing core 806.

It is believed that processes taught by the discussion above can be practiced within various software environments such as, for example, object-oriented and non-object-oriented programming environments, Java based environments (such as a Java 2 Enterprise Edition (J2EE) environment or environments defined by other releases of the Java standard), or other environments (e.g., a .NET environment, a Windows/NT environment each provided by Microsoft Corporation).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for managing a session with a client, comprising:

receiving from said client a request, said request being part of said session, said session handled with a first virtual machine;

placing session state information for said session into an object located in local memory of said first virtual machine, said session state information including a change of a state of said session after a successful handling of said request by said first virtual machine and before a successful handling of an additional request by said first virtual machine said additional request being part of said session;

writing into a shared memory said object, said shared memory shared by said first virtual machine and a second virtual machine, said writing being performed during said session after said successful handling of said request by said first virtual machine and before said successful handling of said additional request by said first virtual machine;

creating a reference from said object in said shared memory to said object in said local memory of said first virtual machine;

in response to a failure that renders said first virtual machine unable to handle said session, reading said object from said shared memory and placing said object into a local memory of said second virtual machine;

receiving from said client said additional request; and handling said additional request with said second virtual machine based on said object.

2. The method of claim 1 wherein said first and second virtual machines are both Java virtual machines.

3. The method of claim 2 wherein said first virtual machine interprets code for a first Java container and said second virtual machine interprets code for a second Java container.

4. The method of claim 1 wherein said method further comprises placing said object in said local memory of said first virtual machine into a deactivated state before said writing.

5. The method of claim 4 wherein said method further comprises deleting said object in said local memory of said first virtual machine while it is in said deactivated state.

6. The method of claim 1 wherein at least one of said first virtual machine and said second virtual machine is running on a computing system having more virtual machines than processors.

7. The method of claim 1, wherein said object is a member of a shared closure.

8. An article of manufacture including program code which, when executed by a machine, causes the machine to perform a method, the method comprising:

receiving from a client a request, said request being part of a session, said session handled with a first virtual machine;

placing session state information for said session into an object located in local memory of said first virtual machine, said session state information including a change of a state of said session after a successful handling of said request by said first virtual machine and before a successful handling of an additional request by said first virtual machine, said additional request being part of said session;

writing into a shared memory said object, said shared memory shared by said first virtual machine and a second virtual machine, said writing being performed during said session after said successful handling of said request by said first virtual machine and before said successful handling of said additional request by said first virtual machine;

in response to a failure that renders said first virtual machine unable to handle said session, reading said object from said shared memory and placing said object into local memory of said second virtual machine;

receiving from said client said additional request; and handling said additional request with said second virtual machine based on said object.

9. The article of manufacture of claim 8 wherein said first and second virtual machines are both Java virtual machines.

10. The article of manufacture of claim 9 wherein said first virtual machine interprets code for a first Java container and said second virtual machine interprets code for a second Java container.

11. The article of manufacture of claim 8 wherein said method further comprises placing said object in said local memory of said first virtual machine into a deactivated state before said writing.

12. The article of manufacture of claim 11 wherein said method further comprises deleting said object in said local memory of said first virtual machine while it is in said deactivated state.

13. A method for managing a session with a client, comprising:

receiving from said client a request, said request being part of said session, said session handled with a first virtual machine;

placing session state information for said session into an object located in local memory of said first virtual machine, said session state information including a change of a state of said session after a successful handling of said request by said first virtual machine and before a successful handling of an additional request by said first virtual machine, said additional request being part of said session;

writing into a shared memory said object, said shared memory shared by said first virtual machine and a second virtual machine, said writing being performed during said session after said successful handling of said request by said first virtual machine and before said successful handling of said additional request by said first virtual machine;

creating a reference from said object in said shared memory to said object in said local memory of said first virtual machine;

in response to a failure that renders said first virtual machine unable to handle said session, reading said object from said shared memory and placing said object into a local memory of said second virtual machine; and receiving from said client said additional request with said second virtual machine based on said object;

handling said additional request with said second virtual machine based on said object.

14. The method of claim 13 wherein said first and second virtual machines are both Java virtual machines.

15. An article of manufacture including program code which, when executed by a machine, causes the machine to perform a method, the method comprising:

receiving from a client a first request, said request being part of said a session, said session handled with a first virtual machine;

placing session state information for said session into an object located in local memory of said virtual machine, said session state information including a change of a state of said session after a successful handling of said request by said first virtual machine and before a successful handling of an additional request by said first virtual machine, said additional request being part of said session;

writing into a shared memory said object, said shared memory shared by said first virtual machine and a second virtual machine, said writing being performed during said session after said successful handling of said request by said first virtual machine and before said successful handling of said additional request by said first virtual machine;

creating a reference from said object in said shared memory to said object in said local memory of said first virtual machine;

in response to a failure that renders said first virtual machine unable to handle said session, reading said object from said shared memory and placing it into a local memory of said second virtual machine;

receiving from said client said additional request; and handling said additional request with said second virtual machine based on said object.

16. The article of manufacture of claim 15 wherein said first and second virtual machines are both Java virtual machines.

* * * * *